United States Patent
Daoud et al.

(10) Patent No.: US 9,213,980 B2
(45) Date of Patent: Dec. 15, 2015

(54) USING BEHAVIORAL DATA IN RATING USER REPUTATION

(75) Inventors: Wisam G. Daoud, San Mateo, CA (US); Sarika Krishnan, San Jose, CA (US); Rishikesh Tembe, San Francisco, CA (US)

(73) Assignee: eBay Inc., San Jose, CA (US)

( * ) Notice: Subject to any disclaimer, the term of this patent is extended or adjusted under 35 U.S.C. 154(b) by 340 days.

(21) Appl. No.: 12/945,637

(22) Filed: Nov. 12, 2010

(65) Prior Publication Data

US 2012/0124192 A1 May 17, 2012

(51) Int. Cl.
*G06F 15/16* (2006.01)
*G06Q 30/02* (2012.01)

(52) U.S. Cl.
CPC ................................. *G06Q 30/02* (2013.01)

(58) Field of Classification Search
CPC ................................................ G06Q 30/0609
USPC ........................................................ 709/224
See application file for complete search history.

(56) References Cited

U.S. PATENT DOCUMENTS

| | | | |
|---|---|---|---|
| 2003/0004855 A1* | 1/2003 | Dutta et al. ................ 705/37 |
| 2004/0080534 A1* | 4/2004 | Quach ........................ 345/751 |
| 2006/0149656 A1* | 7/2006 | Chefalas et al. ............ 705/37 |
| 2006/0195441 A1* | 8/2006 | Julia et al. ................... 707/5 |
| 2007/0192169 A1* | 8/2007 | Herbrich et al. ............ 705/10 |
| 2007/0203852 A1* | 8/2007 | Cameron et al. ............ 705/75 |
| 2008/0015925 A1* | 1/2008 | Sundaresan ................. 705/10 |
| 2008/0015972 A1* | 1/2008 | Walker et al. .............. 705/37 |
| 2008/0046446 A1* | 2/2008 | Sundararajan et al. ..... 707/100 |
| 2008/0162265 A1* | 7/2008 | Sundaresan et al. ....... 705/10 |
| 2008/0208714 A1* | 8/2008 | Sundaresan ................ 705/27 |
| 2008/0235042 A1* | 9/2008 | Boyd et al. ................ 705/1 |
| 2008/0288481 A1* | 11/2008 | Zeng et al. ................ 707/5 |
| 2009/0006115 A1* | 1/2009 | Schwarz .................... 705/1 |
| 2009/0063408 A1* | 3/2009 | Bao et al. .................. 707/3 |
| 2009/0070130 A1* | 3/2009 | Sundaresan et al. ........ 705/1 |
| 2009/0070679 A1* | 3/2009 | Shen et al. ................ 715/733 |
| 2009/0100504 A1* | 4/2009 | Conner et al. ............. 726/3 |
| 2009/0150296 A1* | 6/2009 | Kirovski et al. ........... 705/80 |
| 2009/0271290 A1* | 10/2009 | Van Luchene et al. ..... 705/26 |
| 2009/0327148 A1* | 12/2009 | Kamar et al. .............. 705/80 |
| 2010/0010871 A1* | 1/2010 | Mengerink ................ 705/10 |
| 2010/0057550 A1* | 3/2010 | Nguyen ..................... 705/14.25 |
| 2010/0100427 A1* | 4/2010 | McKeown et al. ......... 705/11 |
| 2010/0153520 A1* | 6/2010 | Daun et al. ................ 709/218 |
| 2010/0211514 A1* | 8/2010 | Sundaresan et al. ....... 705/319 |
| 2010/0281059 A1* | 11/2010 | Lynch ...................... 707/784 |
| 2010/0306037 A1* | 12/2010 | Lee ......................... 705/11 |
| 2011/0004693 A1* | 1/2011 | Rehfuss .................... 709/229 |
| 2011/0040787 A1* | 2/2011 | Cierniak et al. ........... 707/770 |
| 2011/0078156 A1* | 3/2011 | Koss ........................ 707/748 |
| 2011/0082770 A1* | 4/2011 | Krishnamoorthy et al. ......................... 705/26.64 |
| 2011/0231282 A1* | 9/2011 | Dai .......................... 705/26.35 |
| 2011/0295718 A1* | 12/2011 | Chang et al. .............. 705/27.1 |
| 2012/0116923 A1* | 5/2012 | Irving et al. ............... 705/27.1 |

* cited by examiner

*Primary Examiner* — Hamza Algibhah
(74) *Attorney, Agent, or Firm* — Schwegman Lundberg & Woessner, P.A.

(57) ABSTRACT

In a system and method for using user behavior and interaction data to rate a reputation of a user, a processor-implemented tracking component tracks an interaction of a user with a network-based publisher. A processor-implemented reputation component generates a reputation value for the user from the tracked user interaction.

14 Claims, 4 Drawing Sheets

USING BEHAVIORAL DATA IN RATING USER REPUTATION

TECHNICAL FIELD

This application relates to a method and system for rating the reputation of a user using behavioral data.

BACKGROUND

As online applications mature, users and merchants increasingly communicate and participate in a variety of transactions and commerce with each other. Buyers and sellers (e.g., individuals and merchants) transact with each other based on good faith and whatever knowledge they may have about each other as transacting parties and/or members of the transacting community. This knowledge often consists of feedback, in the form of a rating and/or comments, left by one party in a transaction for the other party in the transaction. While counterparty feedback may be informative, it presents only one party's perspective of a user. For various reasons, this perspective may be skewed or biased and may not reflect the user's true reputation in the community. An inaccurate user reputation formed as a result of biased feedback hurts a user's ability to interact in the community and participate in transactions. Thus, the ability to present a more accurate reputation of a user in a community is one hurdle to overcome for improving transaction experiences.

BRIEF DESCRIPTION OF THE DRAWINGS

The present invention is illustrated by way of example, and not by way of limitation, in the figures of the accompanying drawings in which.

DETAILED DESCRIPTION

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

In various embodiments, a system and method to calculating a reputation value of a user of a network-based community using user behavior data is disclosed. A reputation value may be calculated from feedback rating data received in response to a transaction as well as tracked user behavior data.

Figure 1:
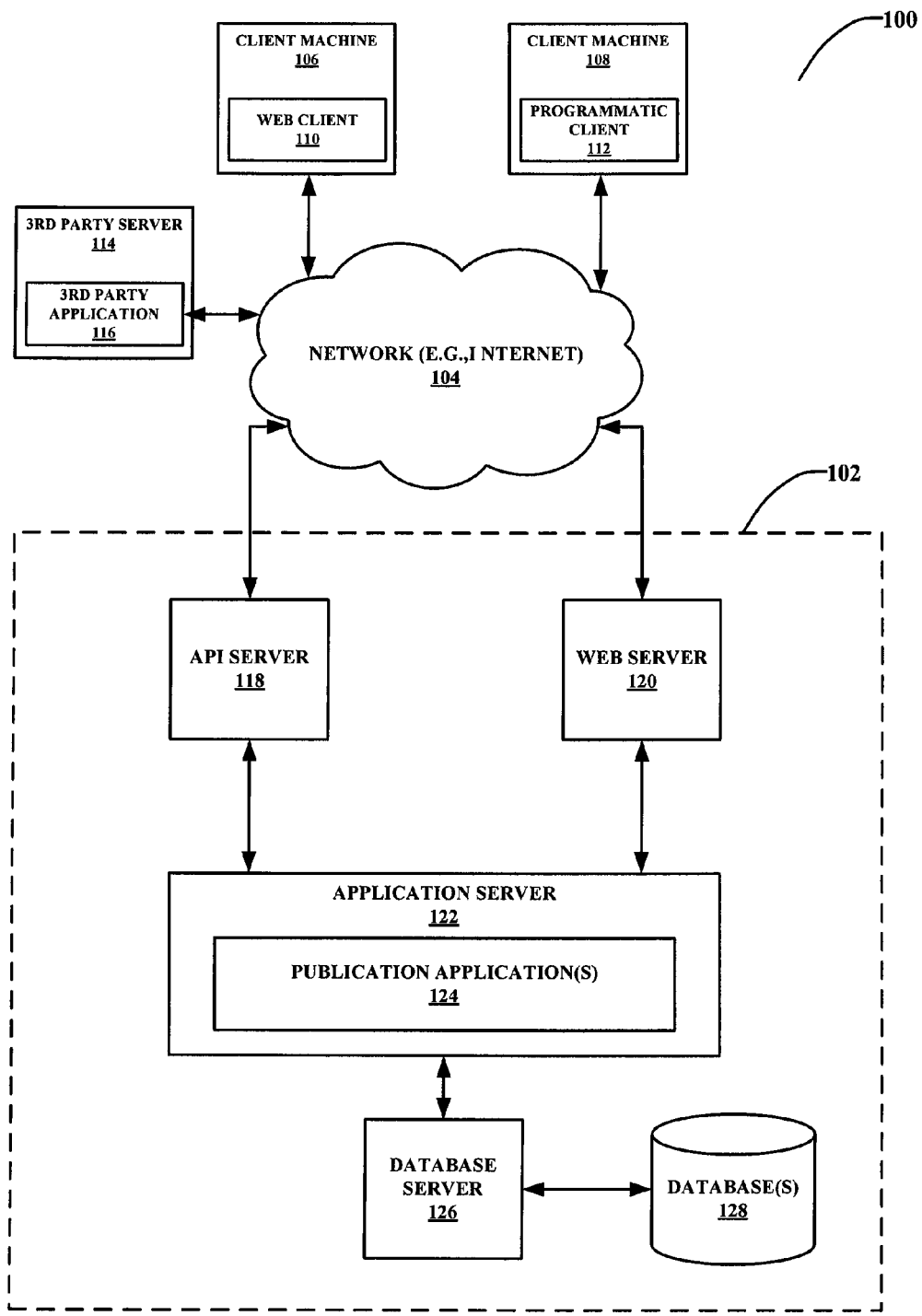
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a publication/publisher system 102 where clients may communicate and exchange data within the network system 100. The data may pertain to various functions (e.g., online item purchases) and aspects (e.g., managing content and user reputation values) associated with the network system 100 and its users. Although illustrated herein as a client-server architecture as an example, other embodiments may include other network architectures, such as a peer-to-peer or distributed network environment.

A data exchange platform, in an example form of a network-based publisher 102, may provide server-side functionality, via a network 104 (e.g., the Internet) to one or more clients. The one or more clients may include users that utilize the network system 100 and more specifically, the network-based publisher 102, to exchange data over the network 114. These transactions may include, but are not limited to, transmitting, receiving (communicating) and processing data to, from, and regarding content and users of the network system 100. The data may include, but are not limited to, content and user data such as feedback data; user reputation values; user profiles; user attributes; product and service reviews; product, service, manufacture, and vendor recommendations and identifiers; product and service listings associated with buyers and sellers; auction bids; and transaction data, among other things.

In various embodiments, the data exchanges within the network system 100 may be dependent upon user-selected functions available through one or more client or user interfaces (UIs). The UIs may be associated with a client machine, such as a client machine 106 using a web client 110. The web client 110 may be in communication with the network-based publisher 102 via a web server 120. The UIs may also be associated with a client machine 108 using a programmatic client 112, such as a client application, or a third party server 114 hosting a third party application 116. It can be appreciated in various embodiments the client machine 106, 108, or third party application 114 may be associated with a buyer, a seller, a third party electronic commerce platform, a payment service provider, or a shipping service provider, each in communication with the network-based publisher 102 and optionally each other. The buyers and sellers may be any one of individuals, merchants, or service providers, among other things.

Turning specifically to the network-based publisher 102, an application program interface (API) server 118 and a web server 120 are coupled to, and provide programmatic and web interfaces respectively to, one or more application servers 122. The application servers 122 host one or more publication application(s) 124. The application servers 122 are, in turn, shown to be coupled to one or more database server(s) 126 that facilitate access to one or more database(s) 128.

In one embodiment, the web server 120 and the API server 118 communicate and receive data pertaining to listings, transactions, and feedback, among other things, via various user input tools. For example, the web server 120 may send and receive data to and from a toolbar or webpage on a browser application (e.g., web client 110) operating on a client machine (e.g., client machine 106). The API server 118 may send and receive data to and from an application (e.g., client application 112 or third party application 116) running on another client machine (e.g., client machine 108 or third party server 114).

The publication application(s) 124 may provide a number of publisher functions and services (e.g., listing, payment) to users that access the network-based publisher 102. For example, the publication application(s) 124 may provide a number of services and functions to users for listing goods and/or services for sale, facilitating transactions, and reviewing and providing feedback about transactions and associated users. Additionally, the publication application(s) 124 may track and store data and metadata relating to listings, transactions, and user interaction with the network-based publisher 102. The publication application(s) 124 may use the tracked data and metadata to calculate a reputation value for the user.

FIG. 1 also illustrates a third party application 116 that may execute on a third party server 114 and may have programmatic access to the network-based publisher 102 via the programmatic interface provided by the API server 118. For example, the third party application 116 may use information retrieved from the network-based publisher 102 to support one or more features or functions on a website hosted by the third party. The third party website may, for example, provide one or more listing, feedback, publisher or payment functions that are supported by the relevant applications of the network-based publisher 102.

Figure 2A:
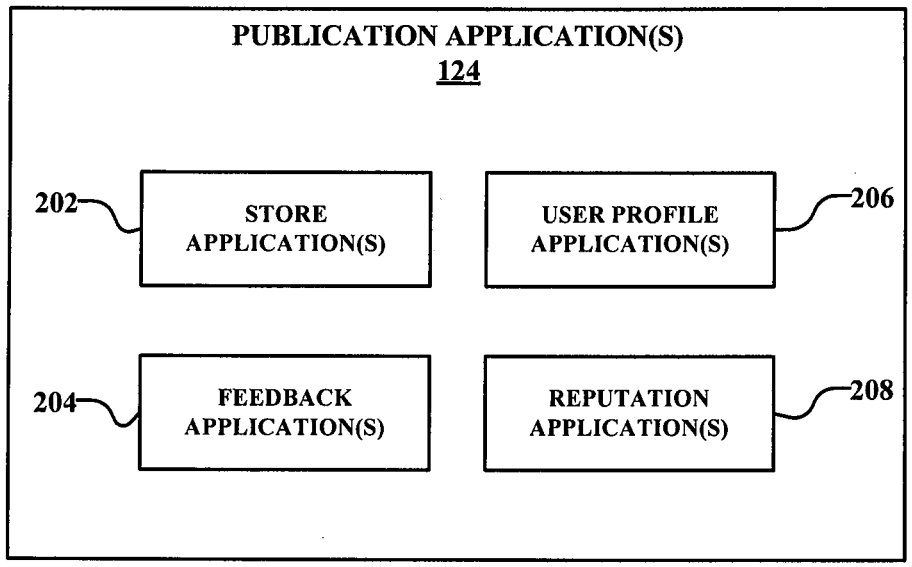
FIG. 2A is a block diagram illustrating an example embodiment of multiple publication applications, which may be provided as part of a network-based publisher.

FIG. 2A is a block diagram illustrating an example embodiment of multiple publication application(s) 124, which are provided as part of the network-based publisher 102. The network-based publisher 102 may provide a multitude of feedback, reputation, user profile, and listing and price-setting mechanisms whereby a user may be a seller or buyer who lists or buys goods and/or services (e.g., for sale) published on the network-based publisher 102.

The publication application(s) 124 are shown to include, among other things, one or more application(s) which support the network-based publisher 102, and more specifically, the listing of goods and/or services for sale, the receipt of feedback in response to a transaction involving a listing, the tracking of data and metadata relating to user interactions with the network-based publisher 102, and the generation of reputation values for users based at least in part on the user interaction data.

Store application(s) 202, permit sellers to list individual goods and/or services (hereinafter generally referred to as "items") for sale via the network-based publisher 102 or group their listings within a "virtual" store, which may be branded and otherwise personalized by and for the sellers. Individual and grouped listings may include details such as a title of an item offered for sale, a description of the item, a price of the item, one or more pictures of the item, a geographic location of the seller or the item, payment and shipping options, and a return policy. The virtual store also may offer promotions, incentives and features that are specific and personalized to a relevant seller. In one embodiment, a seller using a virtual store to sell their goods and services may result in the network-based publisher 102 determining a higher reputation value because of an inherent trustworthiness (e.g., higher reputation value) of a "business" over an individual seller.

Feedback application(s) 204 may allow parties that transact using the network-based publisher 102 to establish, build, and maintain buyer or seller reputations, which may be made available and published to potential trading partners (e.g., users of the network-based publisher 102). Consider, for example, where the network-based publisher 102 supports person-to-person trading, users may have no history or other reference information whereby the trustworthiness and/or credibility of potential trading partners may be assessed. The feedback application(s) 204 may allow a first user, for example, through feedback provided by other users, to establish a buyer/seller reputation within the network-based publisher 112 over time and transactions. Thus, other potential transaction partners (users) may then reference the buyer/seller reputation value of the user for the purpose of assessing credibility, trustworthiness, etc.

Feedback may be received in the form of a rating, such as a one to five star rating scale or a one to ten numerical scale, and answers to a series of questions concerning topics such as satisfaction with a transaction, speed in concluding a transaction, and promptness of payment or shipping. Feedback additionally may be received in the form of comments input by a counterparty to the transaction. Both types of feedback may be viewed by the user to whom they are directed and other parties who access a profile of the user, and may be segregated on a per transaction basis. Conventionally, feedback is limited to the rating, answers, and comments provided by a counterparty, thereby providing a user with only a limited perspective of how the user has performed or how the user is perceived by others in the network-based community. In addition, when other users are attempting to ascertain the reputation of a user, the feedback rating left for a user often is relied upon as a quick reference for determining how reputable a user is. Consequently, relying solely on the feedback left by others may result in an incomplete determination of a reputation value for a user.

User profile application(s) 206 may store user information. User information may include personal information submitted by the user, such as the name, address, telephone number, electronic mail address, birthday, and favorites of the user. User information further may include information about the user obtained from the user's interaction with the network-based publisher 102. For example, if the user operates as a seller on the network-based publisher 102, the user profile application(s) 206 may store information related to the number and type of items sold or offered for sale by the user. If the user operates as a buyer on the network-based publisher 102, the user profile application(s) 206 may store information related to the items purchased by the user, including the prices paid, payment information, and shipping and insurance options selected by the user.

User profile application(s) 206 further may store data about user behavior and interaction with the network-based publisher 102. The publisher 102 or one of its components may monitor a user's interactions with the publisher 102 to obtain a set of user behavior data. For example, the publisher 102 may monitor the response time taken by the user to respond to a message from a transaction counterparty or potential transaction counterparty. In another example embodiment, the user profile application(s) 206 may store data concerning how long it takes a user to ship an item to a buyer. From this data, an average time to ship items may be determined and stored for the user. A third example embodiment may include monitoring and storing the percentage of transactions in which the user provides item tracking information for a buyer. The foregoing examples are intended to be non-limiting example; other data capable of being measured or monitored that relates to a user's performance as a seller (or buyer) may be tracked and stored. Collectively, these and other monitored data may permit a more complete evaluation of a user as a seller (or buyer) to be developed.

Reputation application(s) 208 may operate on the received feedback, the tracked user profile or behavioral data, or the aggregation of feedback and user data to determine a user's reputation. It can be appreciated by one skilled in the art that users may have a multitude of various types of reputation values in the network-based publisher 102. For example, a user may have one reputation value for being a buyer and one as a seller. The user's reputation value may be based on one or more user attributes determined from feedback or tracked user profile or behavioral data. The user attributes may include, but are not limited to, feedback ratings, the user's frequency of interaction with the network-based publisher 102, the number of items a user has sold, the promptness of the user in concluding a transaction or shipping an item, the length of time a user has been using the network-based publisher 102, and a category of transaction including a user's expertise (e.g., power seller) in a category. Some or all of these attributes may have values or weights assigned to them that may be used in conjunction with other values and factors to determine a reputation value of a user.

Reputation application(s) 208 further may provide user reputation data to third party applications through an exposed application programming interface (API). In this respect, third party applications may query the network-based publisher 102 for a trustworthiness determination for a user of the third party system, who may or may not also be a user of the network-based community 100. If the user is part of the network-based community 100, reputation application(s) 208 may retrieve and provide the user's reputation value to the third party system, or may make a determination of trustworthiness and provide the determination to the third party system.

Figure 2B:
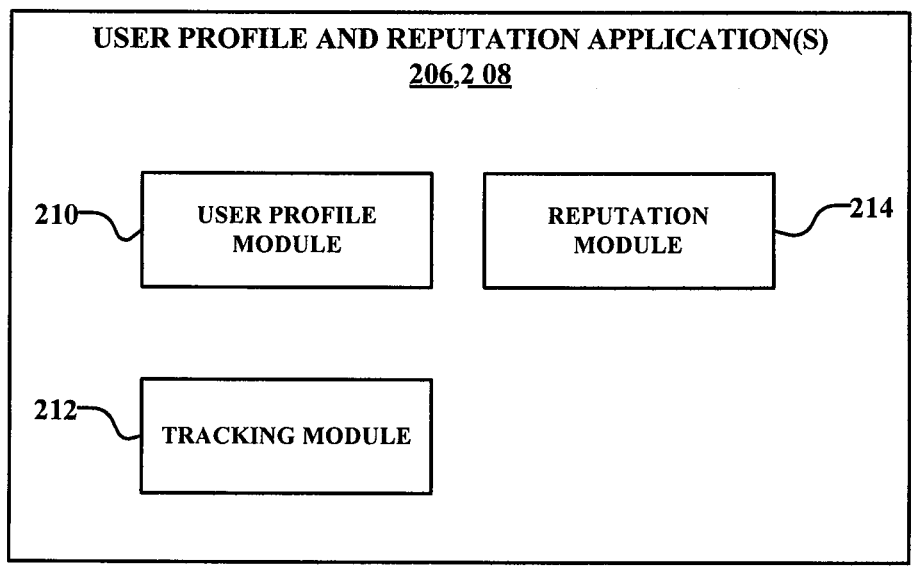
FIG. 2B is a block diagram illustrating an example embodiment of various modules that may used to execute the processes described herein.

FIG. 2B is a block diagram illustrating an example embodiment of a user profile module 210, a tracking module 212, and a reputation module 214, which may be utilized by the user profile application(s) 206 and the reputation application(s) 208 to monitor user behavior and determine a reputation of the user.

In one example embodiment, the user profile module 210 may operate in conjunction with the user profile application(s) 206 to interface with database server(s) 126 and database(s) 128 to access and/or store data concerning observed user behavior and interaction with the network-based publisher 102. Stored user data may include the time it takes a user to respond or interact with the publisher 102 to complete various tasks. For example, the module 210 may store or access the time it takes a user to respond to a question, feedback, or an inquiry from a counterparty. The module 210 also may access the frequency of interaction between the user and the publisher 102, such as the number of times the user logs in or accesses an interface (e.g., website, application) to the publisher or the number of items the user posts for sale on the publisher 102 in a given time period. It is contemplated that any measurable event involving a user's behavior or interaction with the publisher 102 is capable of being accessed and stored.

The user profile module 210 further may store and/or access user-submitted information. User-submitted information may comprise personal information (e.g., name, address, telephone number, electronic mail address), user account information (e.g., username, password, security questions, payment information, billing address, shipping address), and other user-submitted information. Other user-submitted information may include but is not limited to credit history information, property ownership information, and tax information, such as tax returns.

The tracking module 212 may track data related to user behavior or interaction with the publisher 102. The tracking module 212 may monitor the network-based publisher 102 for events generated by the publisher 102 or by the user. For example, an event may be generated when a transaction occurs between the user and another party. The tracking module may monitor the timing of this event and continue measuring the elapsed time before the user acts in response to the occurrence of the event. The tracking module may provide the tracked timing data to the database server(s) 126 for storage in the database(s) 128. The tracking module 212 further may monitor user interaction with the publisher 102 over a period of time. User interaction may include both a frequency of access to the various interfaces (e.g., a publisher website, an application that accesses the publisher) and a frequency of use of publisher functions (e.g., a number of items listed for sale, a number of transactions, a number of items browsed for purchase). User interaction may be monitored over a period of time, with tracked data being measured and monitored over varying time periods.

The tracking module 212 further is configured to monitor the performance of a user, such as, for example, the average time taken to ship an item sold, or the percentage of user listings offering shipping tracking data for the item. In an example embodiment, the tracking module 212 may track the amount of elapsed time between when a transaction closes and when a seller generates a shipping label to ship the transaction item. Additionally, the tracking module 212 may track the amount of time elapsed from when a shipping label is scanned and when the shipped item is delivered. In an example embodiment, this information may be obtained from a third party shipping service. This information may be self-reported by the user, or may be monitored as part of an event that occurs as part of listing or transaction procedures. The tracking module 212 further is configured to communicate with both the database server(s) 126 to store the tracked data in database(s) 128 and with the applications of the publisher 102.

The tracking module 212 may attempt to build or assign structure to collected data relating to a user that otherwise lacks structure. Structure may be given to data through the use of data mining and data organization and classification. Certain types of data, such as items sold, may be readily organized into categories and sub-categories. For example, tracking module 212 may separate transactions into item categories, such as electronics or clothing, and item sub-categories, such as televisions and audio receivers within the electronics category. Other types of data may require data mining to determine an appropriate scheme by which to classify or organize the data. For example, from transaction, shipping, and feedback data, data concerning a seller's performance with respect to geographic regions may be obtained. For example, based on shipping data, a seller's performance when shipping items to Europe compared to Asia may be determined.

Using tracked data, the reputation module 214 may determine a reputation for the user. In one example embodiment, the reputation may take the form of a score or a value, with a higher value indicating a more reputable user as compared to a lower value. In a further exemplary embodiment, each user may have multiple reputational scores or values corresponding to the user's role as a seller or a buyer, or corresponding to the user's role as a seller of a first category of items compared to a seller of a second category of items.

The reputation for a user may be generated or calculated in part based on observed user behavior or interaction data monitored by the tracking module. A more responsive user or a user who performs tasks at a faster observed rate may be accorded a higher reputation value. Similarly, a user who more frequently accesses or interacts with the publisher 102 or who lists or sells more items over a given time period may be accorded a higher reputation value. Also, a user who reports or provides more information about himself to the publisher 102 may be accorded a higher reputation value, on the basis that the verification of the user is more easily ascertainable in light of the reported information. Another reason to accord a higher reputation value to a user who self-reports information is that the user's willingness to self-report personal information may indicate that the user cares about his or her reputation more than a user who fails to provide such information. In an example embodiment, the calculated velocity of a user (e.g., the number of items sold per time period) may influence the reputation value for the user. A user who sells more items over a period of time may be more highly valued than a user who conducts a low volume of transactions. If all other things between the two users are considered equal, the reputation value for a high volume user may be higher than a low volume user.

The reputation value of a user may be solely calculated based on observed user behavior and interaction data. Alternatively, the user behavior and interaction data may be used to adjust a reputation value derived from feedback ratings left by counterparties. Actual calculation of the reputation value may involve the use of a formula applied to one or more user behavior or interaction data values. The data values further may be weighted to place more emphasis or value on certain user behaviors over others. In an example embodiment, the reputation module 214 may weight different user metrics differently, on the theory that certain user metrics may be more indicative of seller trustworthiness. For example, whether a seller timely ships sold items to buyers may be more indicative that the seller is trustworthy than whether a seller visits a website operated by the network-based publisher 102 on a daily basis. Accordingly, outstanding performance in the user metrics that tend to indicate trustworthiness may offset subpar performance in other user metrics. Similarly, poor performance in the user metrics that tend to indicate trustworthiness may offset superior performance in other user metrics.

The reputation for a user may be exposed by the network-based publisher 102 or one of its components to a third party website or server via an API. In this respect, third party websites may use the reputation score or value maintained by the network-based publisher 102 to verify the veracity or trustworthiness of a user on the third party site.

Figure 3:
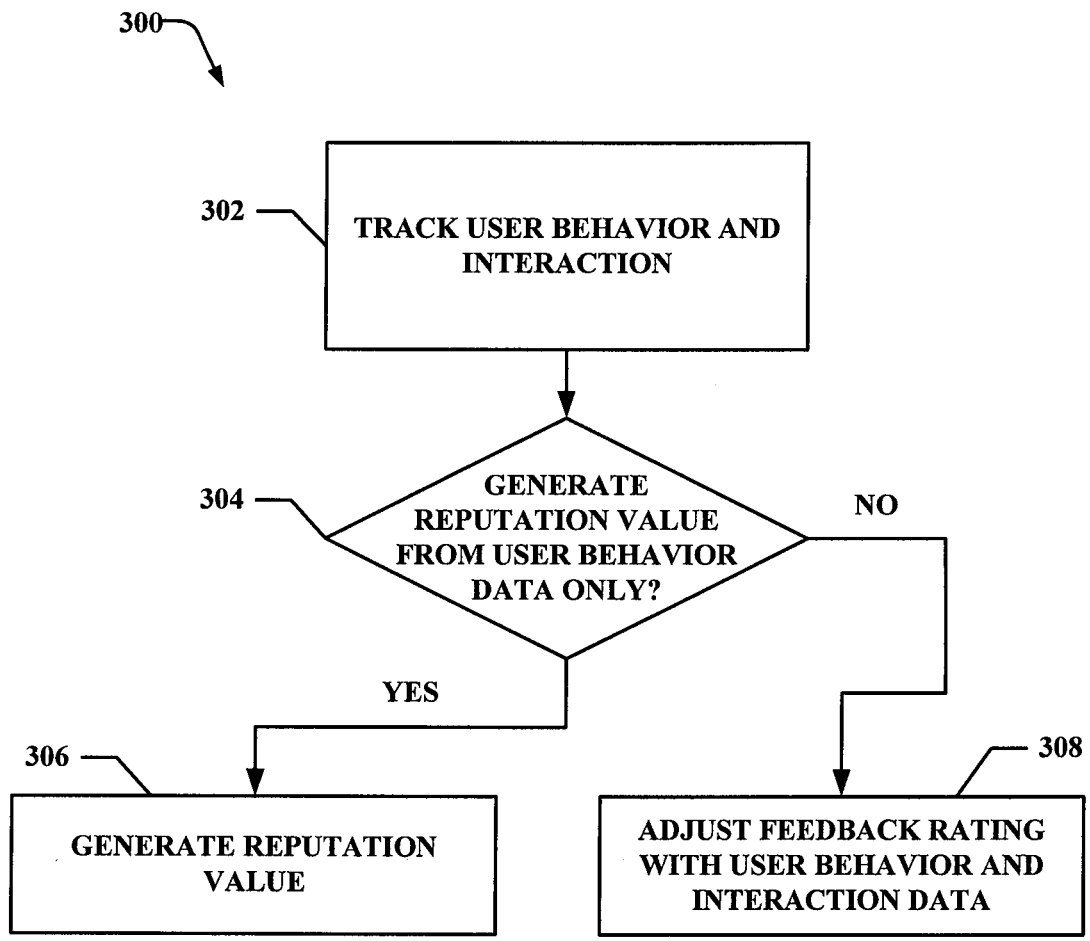
FIG. 3 is a flow chart 300 of an example method for calculating a reputation score for a user.

FIG. 3 is a flow chart illustrating an example embodiment for generating a reputation value for a user using user behavior and interaction data. At operation 302, user behavior and interaction data relating to a user's interaction with the network-based publisher 102 is tracked and stored. User behavior and interaction data may include timing data, frequency data, and performance data. Timing data may relate to observed user response times to various interactions with the publisher 102. For example, a measured user response time may be the amount of time it takes a user to respond to a message. Frequency data may relate to an observed frequency of access or interaction with the publisher 102. For example, frequency data may include the number of items listed or sold by the user over a given time period. Performance data may relate to observed user performance in the user's role as a seller or a buyer. For example, if the user is a seller, performance data may include the percentage of transactions in which the user shipped the item on time.

At decision block 304, a determination as to whether to generate a reputation value for the user solely from the user behavior and interaction data is made. At operation 306, if a determination to generate a reputation value for the user solely from the user behavior and interaction data is made, the reputation value is generated. The reputation value may be a numerical value or a binary (e.g., "yes" or "no") reputation determination. The reputation value may be generated from all or certain ones of the user behavior and interaction data.

At operation 308, if the reputation value is not to be generated solely from the user behavior and interaction data, the user behavior and interaction data may be used to adjust a feedback rating given to the user by other users. The feedback rating may be expressed in terms of stars, numbers, or other identifiers. If the user behavior and interaction data is positive, the feedback rating may be adjusted upward, while if the user behavior and interaction data indicates the user is not responsive and/or active, the feedback rating may be adjusted downward.

Figure 4:
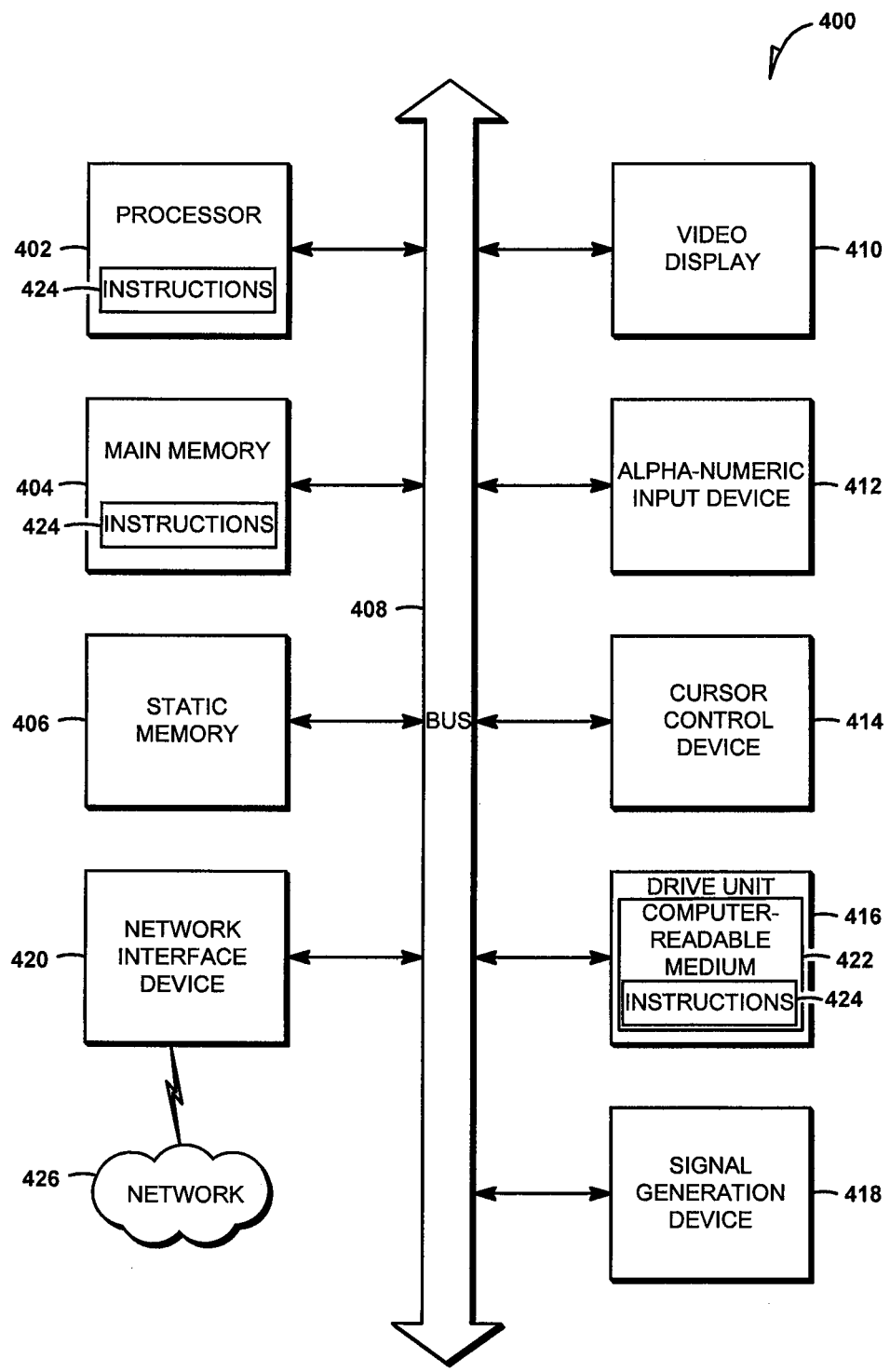
FIG. 4 shows a diagrammatic representation of machine in the example form of a computer system within which a set of instructions may be executed to cause the machine to perform any one or more of the methodologies discussed herein.

FIG. 4 shows a diagrammatic representation of machine in the example form of a computer system 400 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
a processor and executable instructions accessible on a computer-readable medium that, when executed, cause the processor to perform operations comprising:
track a user interaction of a seller with a network-based publisher;
receive a feedback rating from a buyer directed to the seller in regards to a performance of the seller in a transaction of an item between the buyer and the seller;
adjust the received feedback rating based on an increase in a frequency at which the seller accesses an online interface provided by the network-based publisher to list items for sale; and
generate a reputation value of the seller based on the adjusted feedback rating that is both directed to the seller in regards to the performance of the seller in the transaction of the item between the buyer and the seller and adjusted based on the increase in the frequency at which the seller accesses the online interface provided by the network-based publisher to list items for sale.

2. The system of claim 1, wherein the executable instructions further cause the processor to provide the reputation value to a third party system in response to an application programming interface (API) call received by the reputation component.

3. The system of claim 1, wherein the tracked user interaction is an elapsed amount of time between a network-based publisher event and a response by the seller to the network-based publisher event.

4. The system of claim 1, wherein the tracked user interaction is selected from the group comprising a frequency of user access of the network-based publisher over a predetermined time period, a number of items sold by the seller over the predetermined time period, and a number of items offered for sale by the seller over the predetermined time period.

5. The system of claim 4, wherein the tracked user interaction comprises user performance data selected from the group comprising a first percentage of transactions in which the seller shipped a sold item on time and a second percentage of transactions in which the seller offered shipping tracking information for a sold item.

6. A computer-implemented method comprising:
tracking, by a processor, user interaction of a seller with a network-based publisher;
receiving a feedback rating from a buyer directed to the seller in regards to a performance of the seller in a transaction of an item between the buyer and the seller;
adjusting the received feedback rating based on an increase in a frequency at which the seller accesses an online interface provided by the network-based publisher to list items for sale; and
generating, by the processor, a reputation value of the seller based on the adjusted feedback rating that is both directed to the seller in regards to the performance of the seller in the transaction of the item between the buyer and the seller and adjusted based on the increase in the frequency at which the seller accesses the online interface provided by the network-based publisher to list items for sale.

7. The computer-implemented method of claim 6, further comprising:
receiving an application programming interface (API) call from an external third party system, the API call requesting access to one of the reputation value or the adjusted feedback rating; and
providing the one of the reputation value or the adjusted feedback rating to the third party system in response to the API call.

8. The computer-implemented method of claim 6, wherein the tracked user interaction is an elapsed amount of time between a network-based publisher event and a response by the seller to the network-based publisher event.

9. The computer-implemented method of claim 6, wherein the tracked user interaction is selected from the group comprising a frequency of user access of the network-based publisher over a predetermined time period, a number of items sold by the seller over the predetermined time period, and a number of items offered for sale by the seller over the predetermined time period.

10. The computer-implemented method of claim 6, wherein the tracked user interaction comprises user performance data selected from the group comprising a first percentage of transactions in which the seller shipped a sold item on time and a second percentage of transactions in which the seller offered shipping tracking information for a sold item.

11. A non-transitory machine-readable storage medium storing a set of instructions that, when executed by a processor of a machine, cause the machine to perform operations comprising:

tracking user interaction of a seller with a network-based publisher;

receiving a feedback rating from a buyer directed to the seller in regards to a performance of the seller in a transaction of an item between the buyer and the seller;

adjusting the received feedback rating based on an increase in a frequency at which the seller accesses an online interface provided by the network-based publisher to list items for sale; and generating a reputation value of the seller based on the adjusted feedback rating that is both directed to the seller in regards to the performance of the seller in the transaction of the item between the buyer and the seller and adjusted based on the increase in the frequency at which the seller accesses the online interface provided by the network-based publisher to list items for sale.

12. The non-transitory machine-readable storage medium of claim 11, wherein the tracked user interaction is an elapsed amount of time between a network-based publisher event and a response by the seller to the network-based publisher event.

13. The non-transitory machine-readable storage medium of claim 11, wherein the tracked user interaction is selected from the group comprising a frequency of user access of the network-based publisher over a predetermined time period, a number of items sold by the seller over the predetermined time period, and a number of items offered for sale by the seller over the predetermined time period.

14. The non-transitory machine-readable storage medium of claim 11, wherein the tracked user interaction comprises user performance data selected from the group comprising a first percentage of transactions in which the seller shipped a sold item on time and a second percentage of transactions in which the seller offered shipping tracking information for a sold item.

* * * * *